United States Patent
Conrads et al.

[11] Patent Number: 5,572,257
[45] Date of Patent: Nov. 5, 1996

[54] ARRANGEMENT COMPRISING A SENSOR MATRIX

[75] Inventors: Norbert Conrads, Hauset, Belgium; Ulrich Schiebel; Herfried Wieczorek, both of Aachen, Germany

[73] Assignee: U.S. Philips Corporation, New York, N.Y.

[21] Appl. No.: 400,427

[22] Filed: Mar. 3, 1995

Related U.S. Application Data

[63] Continuation of Ser. No. 893,141, Jun. 3, 1992, abandoned.

[30] Foreign Application Priority Data

Jun. 3, 1991 [DE] Germany .......................... 41 18 154.9

[51] Int. Cl.⁶ .............................. H04N 3/14; H04N 5/335
[52] U.S. Cl. .......................... 348/308; 348/304; 348/299
[58] Field of Search ................................. 348/294, 299, 348/302–304, 308–310, 314; 250/208.1; H04N 3/14, 5/33 R

[56] References Cited

U.S. PATENT DOCUMENTS

| | | | |
|---|---|---|---|
| 4,280,151 | 7/1981 | Tsumekawa et al. | 360/33 |
| 4,322,752 | 3/1982 | Bixby | 358/213 |
| 4,330,796 | 5/1982 | Anagnostopoulos et al. | 358/213 |
| 4,382,187 | 5/1983 | Fraleux et al. | 250/578 |
| 4,621,291 | 11/1986 | Takamoto et al. | 358/213 |
| 4,725,987 | 2/1988 | Cates | 365/220 |
| 4,788,592 | 11/1988 | Yamawaki et al. | 358/213.29 |
| 5,144,447 | 9/1992 | Akimoto et al. | 358/213.11 |
| 5,196,938 | 3/1993 | Blessinger | 358/209 |

Primary Examiner—Michael T. Razavi
Assistant Examiner—Bipin Shalwala
Attorney, Agent, or Firm—Jack D. Slobod

[57] ABSTRACT

In an arrangement of light-sensitive or X-ray sensitive sensors ($S_{1,1}, \ldots, S_{2048,2048}$) arranged in a matrix in rows and columns, which sensors produce charge states in dependence upon the amount of incident radiation and each have an electrical switch, for each sensor row a switching line ($33_1, \ldots, 33_{2048}$) via which the switches (3) can be activated so that the charge states of the sensors of the activated sensor row are read or reset simultaneously via associated read lines (8, 9, 10), there is provided a reset device (30a, 30b) for resetting the charge states of previously read sensor rows, which device activates at least one of the previously read sensor rows, which activates another of the previously read sensor rows after a predetermined number of clock pulses of a reset clock signal ($T_{32}$), and which deactivates each activated sensor row a predetermined number of clock pulses after its activation.

20 Claims, 5 Drawing Sheets

ARRANGEMENT COMPRISING A SENSOR MATRIX

This is a continuation of application Ser. No. 07/893,141, filed Jun. 3, 1992, now abandoned.

BACKGROUND OF THE INVENTION

1. Field of the Invention

The invention relates to an arrangement comprising light-sensitive or X-ray sensitive sensors arranged in a matrix in rows and columns, which sensors produce charges in dependence upon the amount of incident radiation and each have an electrical switch, for each sensor row a switching line via which the switches can be activated so that the charges of the sensors of the activated sensor row are read simultaneously via associated read lines.

2. Description of the Related Art

Such an arrangement is known from the European Patent Specification 0,028,960 which corresponds to U.S. Pat. No. 4,382,187, and from German Patent Application 4,002,431, which corresponds to commonly-owned U.S. patent application Ser. No. 644,713 filed Jan. 23, 1991 having the same inventors as the present application. In these known arrangements the charges stored in the sensors of the matrix upon exposure to light or X-rays are read out successively in a row-by-row fashion. This is effected in such a manner that only one sensor row at a time is activated via the read line associated with this row. The charge from each sensor of this row is then removed via an associated read line, after which it is further processed. The charges of the sensor rows are thus read out in succession.

In medical X-ray diagnostics it is desirable to utilise such methods not only for recording single images but also for recording rapid image sequences up to 60 images per second. The image sequences may then be recorded by means of the sensor matrix in a continuous or in a pulsed exposure mode. For recording each individual image of such an image sequence the sensor matrix should be set to its initial state, i.e. the sensor matrix should be free from any traces of the last recording. This problem occurs in particular with rapid image sequences because the charges of the sensors are not drained completely during the (rapid) read process. As a result, the individual sensor elements will contain residual charges whose magnitude depends on the exposure intensity of the preceding recording. These charges add to those produced in the sensor during a subsequent image. In terms of time this is to be regarded as nothing else than crosstalk of successive images.

SUMMARY OF THE INVENTION

It is an object of the invention to improve the arrangement of the type defined in the opening paragraph so as to mitigate this problem.

According to the invention this object is achieved in that for draining the residual charges from previously read sensor rows there is provided a reset device which activates at least one of the read-out sensor rows, which each time after a predetermined number of clock pulses of a reset clock signal activates a further sensor row of the read-out sensor rows, and which deactivates each activated sensor row a predetermined number of clock pulses after its activation.

By means of this reset device the problem outlined above can be eliminated to a large extent. For this purpose the reset device is constructed to drain the residual charges of previously read sensor rows after reading of an individual or of all the sensor rows. To this end at least one of these read-out sensor rows is first activated via the associated read line. As a result, the electrical switches of the sensors of these sensor row are turned on and the residual charges still left in the sensors after the preceding read operation are drained via the associated read lines. Subsequently, the reset device activates at least one further row of the previously read sensor rows via the associated read line(s). This process continues until all the previously read sensor rows have been activated. However, each sensor row is then deactivated a preselected number of pulses of a reset clock signal after its activation, i.e. each sensor row remains activated only for the duration of this number of clock pulses.

The sensor rows are activated after one another because a concurrent activation of all the sensors of the matrix in order to drain the residual charges would give rise to very large charges or currents on the read lines, which cannot be handled by the subsequent circuit devices, in particular amplifiers, i.e. the large currents would destroy these circuit elements.

However, in the arrangement in accordance with the invention only a specific number of sensor rows is activated at the same time, so that at each activation instant only a part of all the charges of the sensors of the matrix is drained via the read lines. How many sensor rows are activated at a time depends on the construction of the sensor matrix and the following circuit elements, the number of rows being selected so as to preclude damage to the subsequent circuit elements.

The duration of the number of pulses of the reset clock signal for which each individual sensor row is activated is selected in such a way that a satisfactory part of the residual charges of the sensors is drained. It may for example be selected in such a manner that approximately 99% of the residual charges are drained. For this value the time integration described above is distinctly reduced and the reset device requires a comparatively short time for the activation of the different sensor rows, permitting satisfactorily rapid image sequences.

In an embodiment of the invention the reset device comprises a shift-register device, each switching line of the matrix is coupled to each time one output of the shift-register device, and a pulse is applied to the input side of the shift-register device, which pulse traverses the shift-register device in the clock rhythm of the reset clock signal and appears on the outputs thereof shifted in time.

Such a shift-register device simply enables the sensor rows to be successively activated for each time the same length of time. The pulse applied to the input side of the shift-register device has this length and is shifted through the shift-register device in the rhythm of the rest clock signal. As a result, this pulse each time appears on the outputs of the shift-register device shifted in time by at least one period of the reset clock signal, so that the sensor rows are activated time sequentially.

In the simplest case, in a further embodiment, all the sensors of each column of the matrix have an associated common read line, and the reset device drains the residual charges for all the sensor rows.

In this way the reset device can activate each sensor individually. This can be effected not only for draining the residual charge but also for draining the charges stored in the sensors during imaging, i.e. for the actual read-out of a recorded image. Thus, the reset device can perform two functions, so that all in all hardly any additional expense is incurred for the reset device in comparison with an arrangement comprising a normal read-out device.

Suitably, the reset device can be constructed in such a manner that it initially activates one sensor row and subsequently, after the predetermined number of clock pulses, each time activates one further sensor row. With this construction only one sensor row at a time is activated, so that at such an activation instant the charge of each time only one sensor element is drained via the different read lines. This is the safest construction because in this modification the maximum charge which can be drained in the reset mode is also equal to the amount which can be stored in one sensor.

For this reason it is then also possible, in a further embodiment of the invention, that the frequency of the reset clock signal is higher than the cycling frequency with which the sensor rows are activated successively during a read cycle of the sensors. This has the advantage that the reset device can perform the reset operation in a comparatively short time.

Instead of the activation of only one sensor row at a time it is possible that the reset device initially activates n sensor rows and subsequently, after the predetermined number of clock pulses, each time activates n further sensor rows, n being an integer larger than 1.

In this case a plurality of sensor rows, i.e. n sensor rows, are activated concurrently at the beginning of the reset process and also afterwards. The amount of charge drained at such an activation instant is then larger but the reset process can be effected in a shorter time.

In order to achieve this, in a further embodiment of the invention, the shift-register device comprises n registers, the pulse supplied to the input side of the shift-register device is applied to the input side of each of the n shift registers and traverses each of the n shift registers in the clock rhythm of the reset clock signal, and each of the switching lines of the matrix is coupled to an output of the shift registers.

The pulse supplied to the shift-register device is applied to the input side of each of the n shift registers and is shifted through these shift registers in the rhythm of the reset clock signal. Thus, the shift registers simultaneously activate one sensor row each. This means that in the case of n shift registers n sensor rows are activated at the same time.

In such an arrangement n shift registers simultaneously activate a plurality of sensor rows at a given instant, which has the advantage that the frequency of the reset clock signal can be equal to the cycling frequency with which the sensor rows are activated successively during a read cycle of the sensors as is the case in the further embodiment. The advantage of such an embodiment is that the reset clock signal can also be used in unmodified form as the clock signal for the read process, which further simplifies the arrangement as a whole.

BRIEF DESCRIPTION OF THE DRAWING

Two embodiments of the arrangement in accordance with the invention will now be described in more detail, by way of example, with reference to the drawings. In the drawing.

DETAILED DESCRIPTION OF THE PREFERRED EMBODIMENTS

Figure 1:
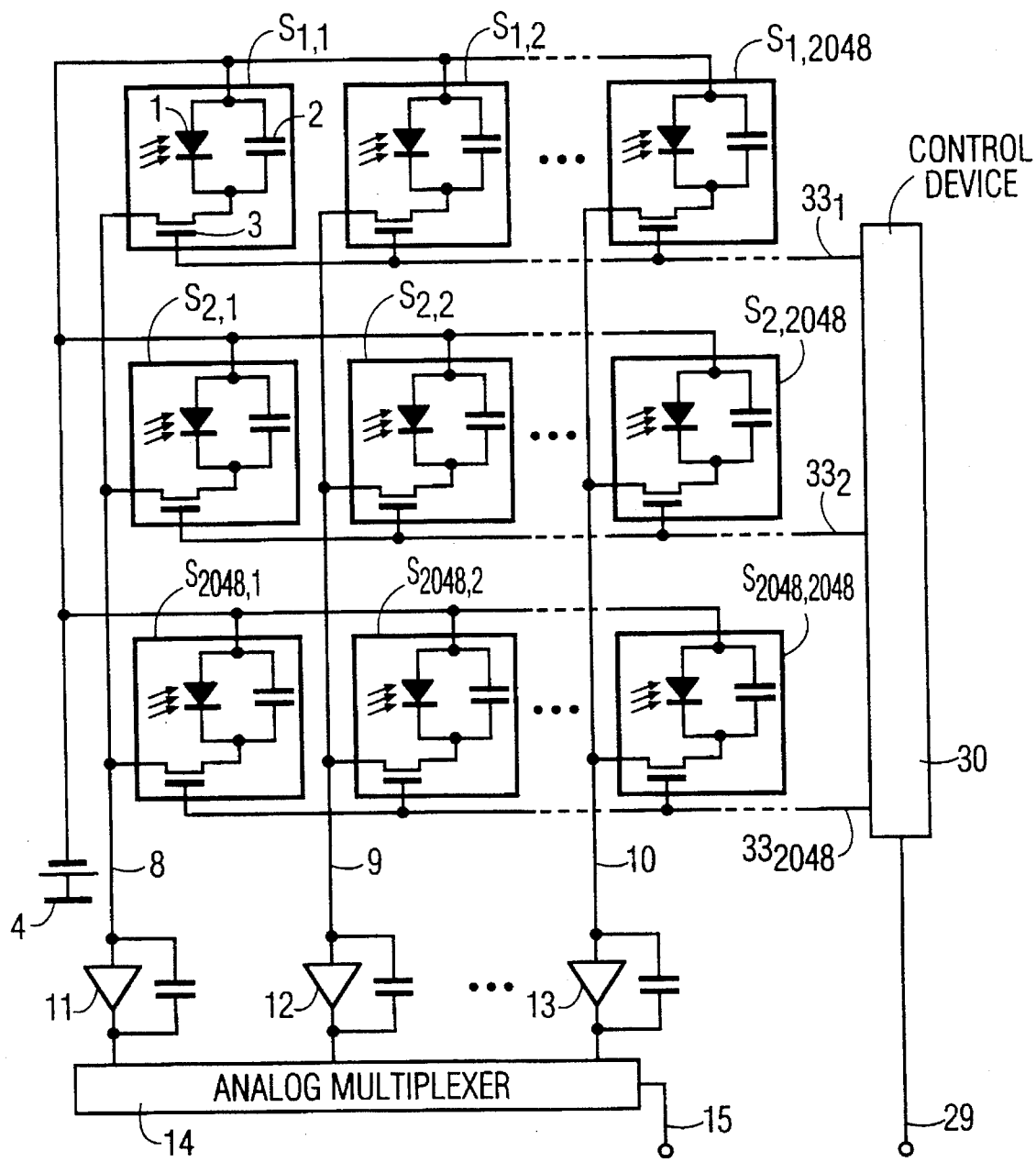
FIG. 1 shows diagrammatically a sensor matrix.

FIG. 1 shows diagrammatically a sensor matrix, which in the present example comprises 2048×2048 sensors, arranged in columns and rows in equal numbers. FIG. 1 by way of example shows only a few of these sensors. For example, in the first row in FIG. 1 only the sensors $S_{1,1}$, $S_{1,2}$ and $S_{1,2048}$ are shown. In the first column in FIG. 1 only the sensors $S_{1,1}$, $S_{1,2}$ and $S_{2048,1}$ are shown by way of illustration.

Each of the sensors is constructed in the same way. When suitable semiconductors are used the sensors themselves may be sensitive to X-rays, if desired. However, for use in X-ray diagnostics it is also possible to utilise a light-sensitive photodiode, which receives light upon the incidence of X-rays on a phosphorus layer arranged above it. The construction of the sensors of the matrix shown in FIG. 1 will now be described, by way of example, for the sensor $S_{1,1}$.

The sensor comprises a photodiode 1, which is exposed to radiation, as indicated in FIG. 1. A storage capacitance 2 is arranged in parallel with the photodiode 1. The anode of the photodiode 1 and one electrode of the storage capacitance 2 are connected to a direct voltage source 4 to bias these electrodes with a negative direct voltage. The cathode of the photodiode 1 and the other electrode of the storage capacitance 2 are both connected to the source terminal of a field-effect transistor 3 serving as an electrical switch. The sensor can be fabricated, for example, in thin-film technology.

When radiation is incident on the photodiodes 1 of the various sensor elements the photodiodes become conductive and, discharges the storage capacitances 2 of the sensors from the initial voltage equal and opposite to direct voltage source 4, the amount of discharge depending on the intensity of the radiation impinging on the relevant photodiode of a sensor. Consequently, a charge accepted by the capacitances 2 subsequent to said discharge during a specific time corresponding to the width of a read pulse, is indicative of the present charge state of the sensor and is a measure of the radiation intensity. This charge can be supplied individually to each sensor element by controlling the switching transistors 3. Effectively, the charge states of the sensors are individually read.

For this purpose there is provided in the first place a switching line for each row of the sensor matrix. In the example shown in FIG. 1 there is provided a switching line $33_1$ for the first row, a switching line $33_2$ for the second row, and a switching line $33_{2048}$ for the $2048^{th}$ row. These switching lines are connected to the gate terminals of the field-effect transistors 3 of the sensors. A switching line thus selects the sensors of the associated sensor row. The switching lines are activated by means of a control device 30 which is used both in the sensor read mode and in a reset mode. This device will be described in more detail with reference to FIGS. 2 to 5.

For each column of the matrix which is shown partly in FIG. 1 there is provided a respective read line 8, 9 and 10. These read lines are all connected to the drain terminals of the field-effect transistors of the associated column.

In each of the read lines, of which only three lines are shown, an integrating amplifier 11, 12 or 13 is arranged. The recharging currents are fed via the read lines and integrated by these amplifiers. The output of the amplifiers, which are proportionate to the charges accepted by the sensors are subsequently converted into a serial signal in an analog multiplexer 14, which signal is available on an output 15 of the multiplexer for further processing.

Figure 2:
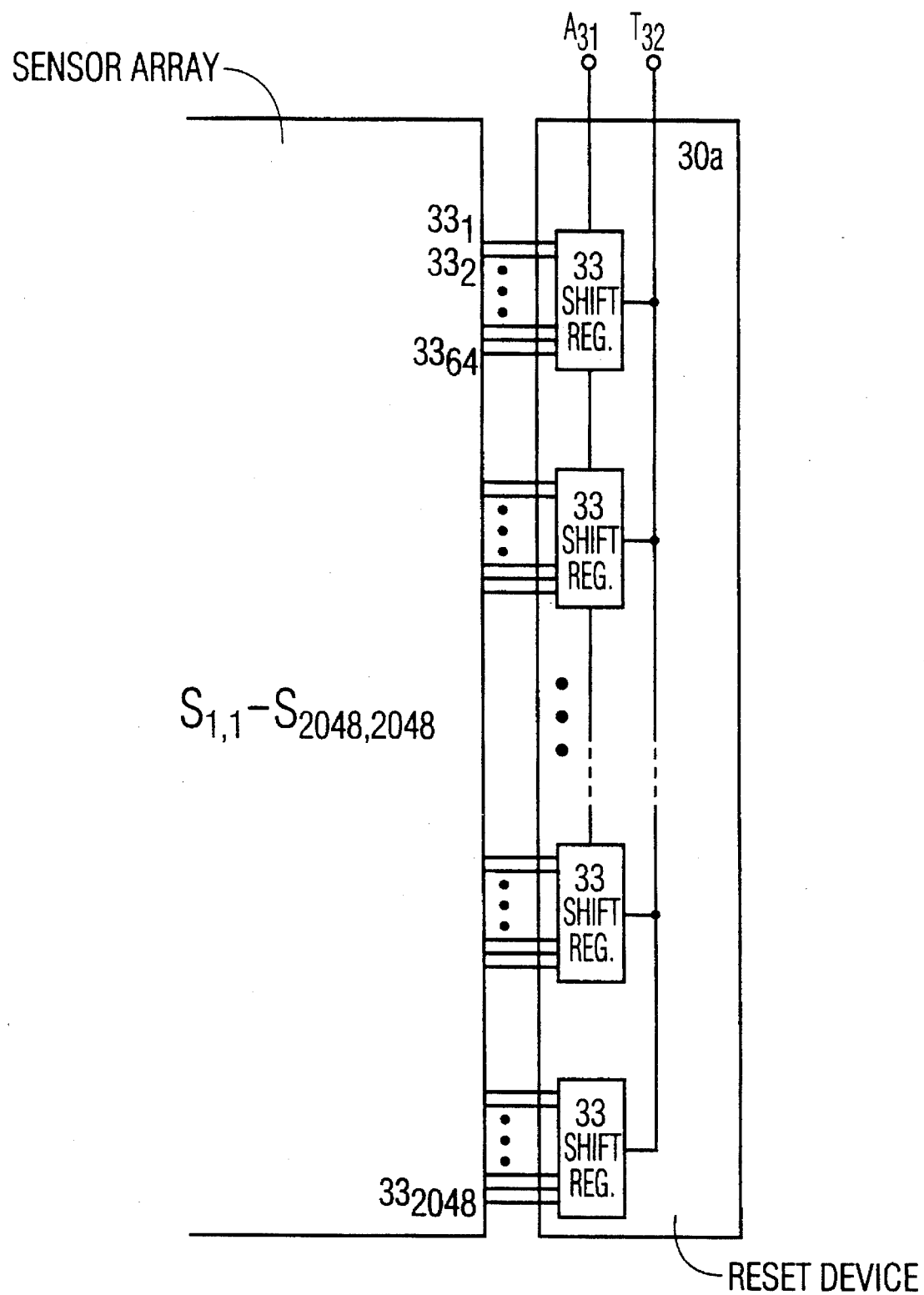
FIG. 2 is a block diagram of a first example of a reset device for the matrix shown in FIG. 1.

FIG. 2 is a block diagram showing a first example of a reset device 30a, which can be used for the control device 30 in FIG. 1. The device 30a in FIG. 2 is constructed in such a manner that it is suitable not only as a reset device but also a control device for the read process.

In FIG. 2 the sensor matrix is shown as a block bearing the reference $S_{1,1}, \ldots S_{2048,2048}$. This sensor matrix comprises 2048 switching lines via which the 2048 rows of the matrix can be activated individually. FIG. 2 by way of example shows only a few of these switching lines. The switching lines are referenced $33_1, 33_2, \ldots 33_{2048}$.

The reset device 30a shown in FIG. 2 is constructed to activate only one sensor row at a time. For this purpose the device comprises shift registers 33 arranged after one another and having 64 outputs each. Since there are 2048 sensor rows in total thirty-two shift registers 33 are arranged cascade.

A pulse signal $A_{31}$ in FIG. 2 can be applied to the input side of the shift-register chain comprising the shift registers 33. This signal provides a pulse for a reset process to be carried out by the reset device, which pulse is shifted through the register chain 33 and successively appears on the outputs of the registers, so that the switching lines $33_1$ to $33_{2048}$ are activated successively for the duration of the pulse. For the shifting process a switching clock signal is needed, which signal is applied to each shift register 33 and which is referenced $T_{32}$ in FIG. 2.

Figure 3:
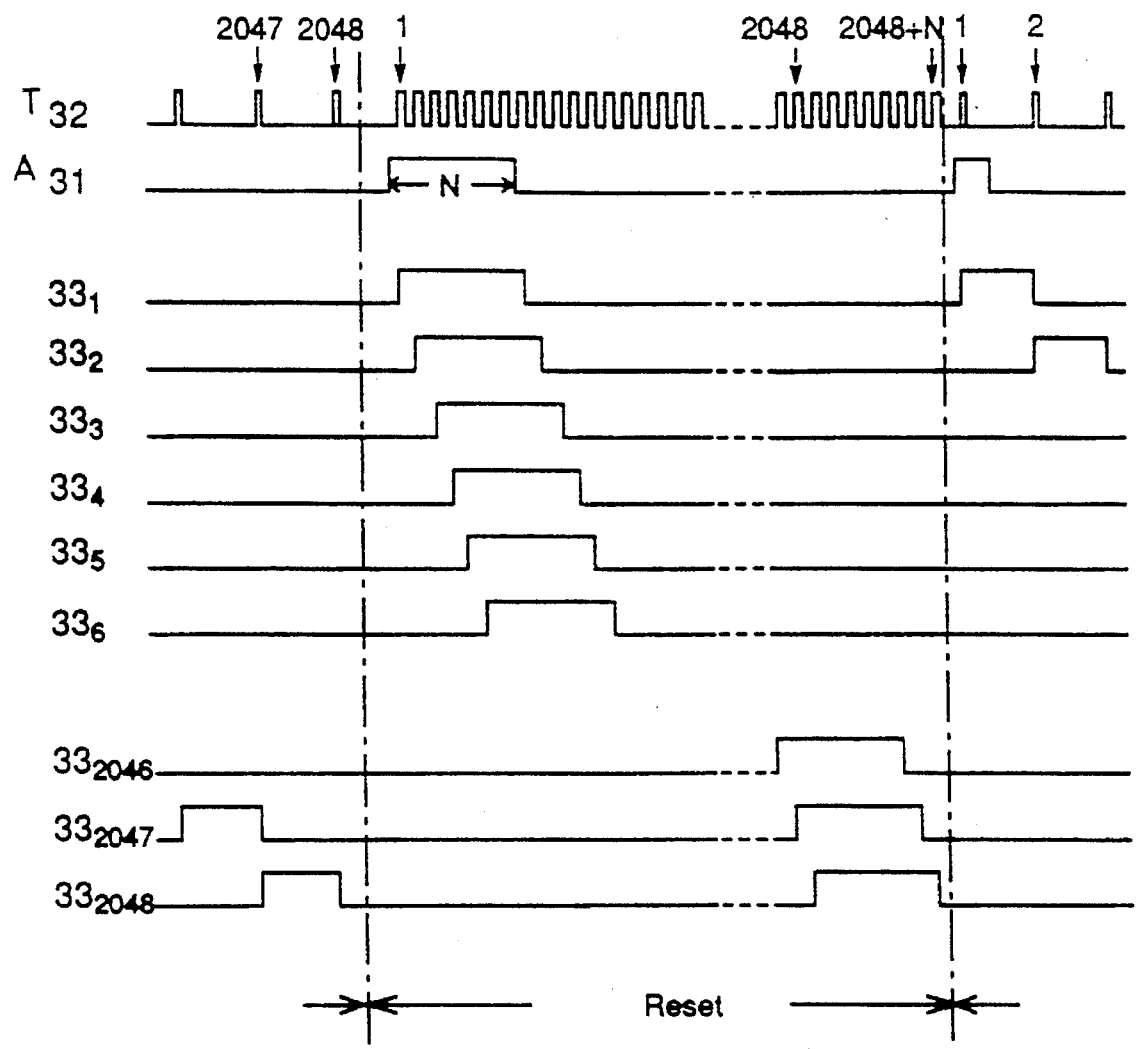
FIG. 3 is a time diagram showing some signal waveforms appearing in the device shown in FIG. 2.

The operation of the circuit shown in FIG. 2 will now be described in more detail with reference to FIG. 3. The reset device 31a shown in FIG. 2 is used not only as a reset device but also as a control device for the read process of the sensor matrix. For this purpose the clock signal $T_{32}$ is used as a read clock signal in a first time interval shown in FIG. 3. In FIG. 3 by way of example shows this read process for the sensor rows 2047 and 2048, which process is controlled by means of the clock signal $T_{32}$ and the register chain comprising the registers 33. At the end of such a read process these two rows are read out, of course after the successive read-out of the rows 1 to 2046.

In a second time interval shown in FIG. 3 the frequency of the clock signal $T_{32}$ is increased. A pulse of the signal $A_{31}$ is applied to the input side of the register chain comprising the registers 33, which pulse is shifted through the register chain and successively appears on the outputs of the registers. In the situation shown in FIG. 3 this pulse of a width N will first appear on the first output of the first register 33, so that the switching line $33_1$ of the first row is activated. Subsequently, upon the next pulse of $T_{32}$ the second sensor line $33_2$ is activated. This continues for the next rows, of which only a few rows are indicated in FIG. 3, until finally the last switching line $33_{2048}$ of the sensor row 2048 is activated. Each of these activation operations proceeds in conformity with the pulse width N of the pulse of the signal $A_{31}$, i.e. each switching line is activated only for the time defined by the pulse of the signal $A_{31}$. In the present reset device a reset pulse is commenced on only one sensor row at a time and the number of overlapping reset pulses is sufficiently small that the maximum charge transferred via the read lines of the arrangement shown in FIG. 1 is constrained to an amount which would not cause an overload of the subsequent amplifiers. In order to minimise the duration of the reset process the signal $T_{32N}$ is applied as a reset clock signal of increased frequency during this process.

FIG. 3 also shows the beginning of a read process following the second time interval, in which the above reset process is carried out, during which read process the clock signal $T_{32}$ again has a lower frequency. A pulse provided by the signal $A_{31}$ is again shifted through the register chain comprising the registers 33, so that the rows 1 to 2048 are activated successively, a next row not being activated until the row has been deactivated. This is necessary for the process of reading the image information from the sensors because obviously the individual sensor rows should be processed separately to enable the charges supplied to be allocated to the individual sensors.

Figure 4:
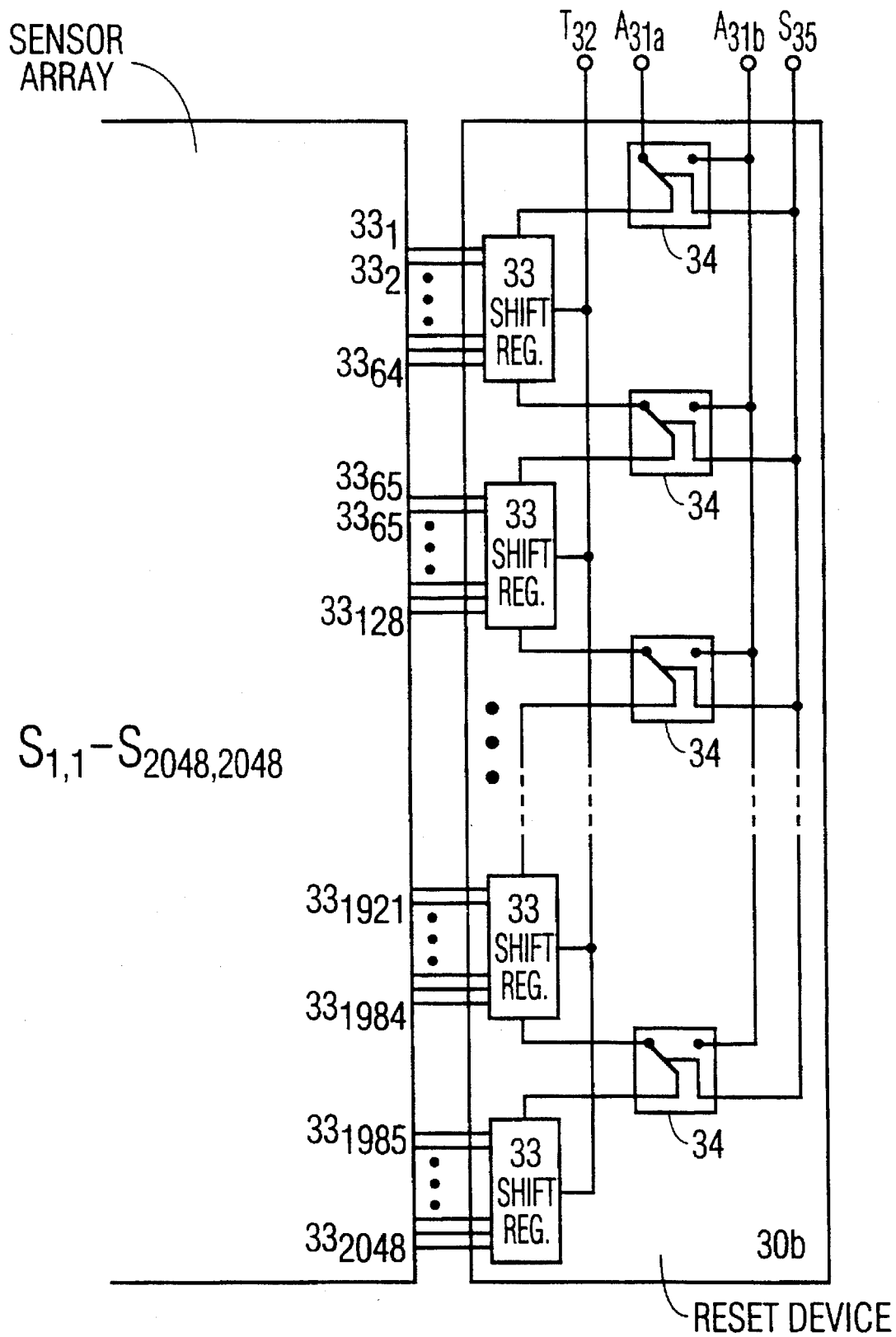
FIG. 4 shows a second example of a reset device for the matrix shown in FIG. 1.

FIG. 4 shows a second example of a reset device 30b, which can be used for the device 30 in the matrix shown in FIG. 1. Instead of only one at a time sixteen sensor rows are activated simultaneously for the reset process in this second example.

The device 30b shown in FIG. 4 again comprises thirty-two shift registers 33, to which the clock signal $T_{32}$ is applied. It further comprises switches 34, which are controlled by means of a switching signal $S_{35}$. These switches 34 can be controlled in such a manner that in a first switch position the shift registers 33 are arranged in series and that an input signal $A_{31a}$ is applied to the input side of the first of these shift registers. In a second switch position of the switches 34 the registers are no longer arranged in series but a switching signal $A_{31b}$ is applied to the input side of each of the shift registers 33. The first switch position, in which the shift registers 33 are arranged in series, corresponds to the read process and the second switch position corresponds to the reset process.

Figure 5:
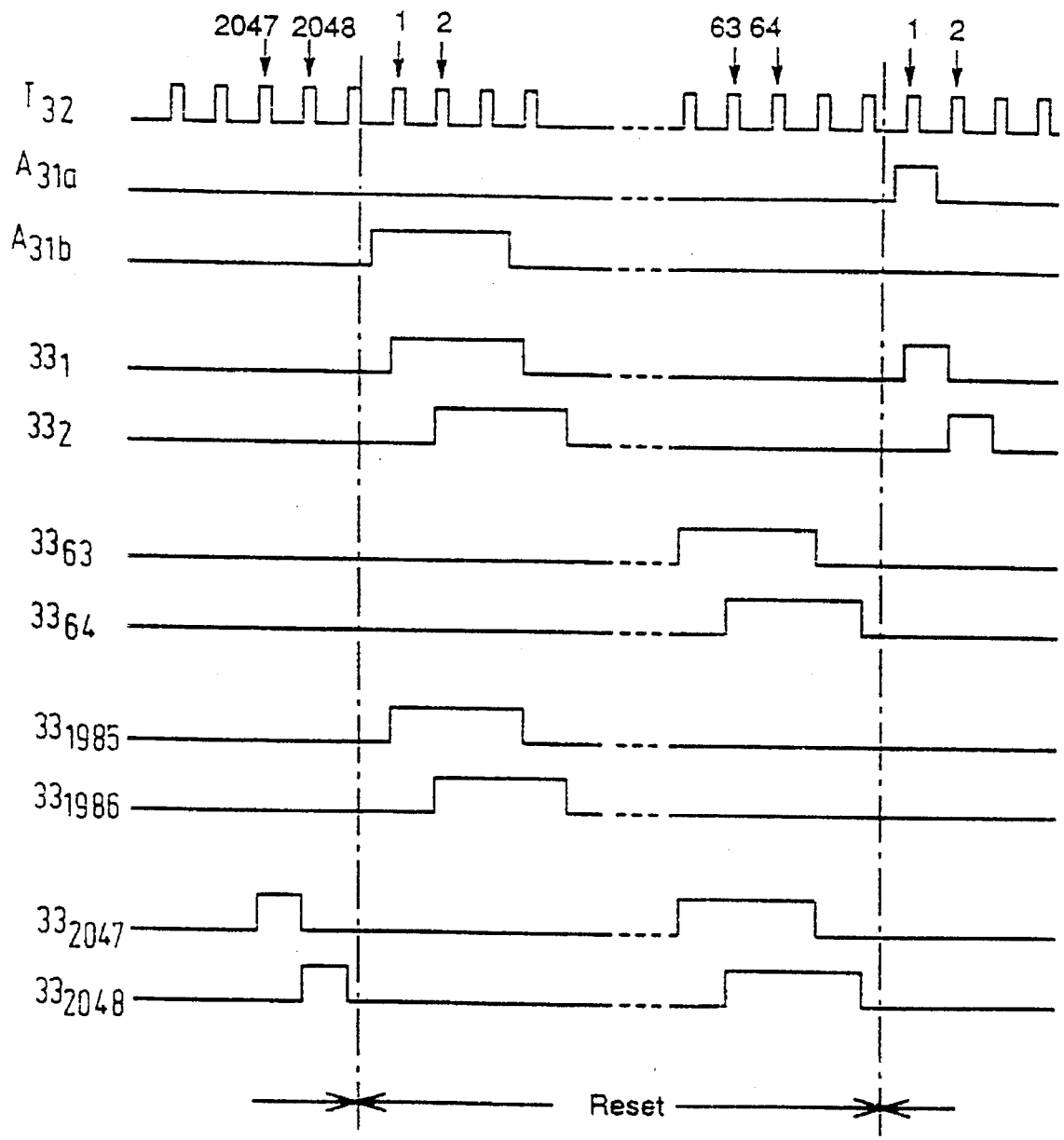
FIG. 5 is a time diagram showing some signal waveforms appearing in the device shown in FIG. 4.

This will be described in more detail with reference to FIG. 5, which is a time diagram showing some signal waveforms appearing in the device shown in FIG. 4. FIG. 5 shows the clock signal $T_{32}$, which is used as a reset clock signal and also as a read clock signal in the read mode. As is shown in FIG. 5, this signal $T_{32}$ has the same frequency both as a reset clock signal and as a read clock signal, i.e. it is used in unmodified form both in the read mode and in the reset mode.

A first time interval in FIG. 5 again represents the read process for the sensor rows 2047 and 2048, with which a read process is terminated. During such a read process the switches 34 of the device shown in FIG. 4 occupy their first switch positions, so that the shift registers 33 are arranged in series. In the second time interval in FIG. 5 the switches 34 are set to their second switch positions, so that a pulse of the signal $A_{31b}$, indicated in the second time interval in FIG. 5, is applied to the input side of each of the shift registers 33. As a result, this pulse appears on an output of each of the thirty-two shift registers 33 upon the next clock pulse of the signal $T_{32}$. In the example of FIG. 5 this is shown for the switching lines $33_1$ and $33_{1985}$. Upon the next clock pulse of the signal $T_{32}$ said pulse again appears on an output of each of the thirty-two shift registers 33, which by way of example is shown in FIG. 5 for the switching lines $33_2$ and $33_{1986}$. This proceeds until the last outputs of the shift registers have been activated, i.e. in the situation illustrated in FIG. 5 the switching lines $33_{63}$ in the penultimate cycle and finally the switching lines $33_{64}$ and $33_{2048}$.

In this case each individual switching line or each individual output of the shift register 33 also remains activated for a given number of clock pulses of the clock signal $T_{32}$, the duration being dependent upon the width of the pulse of the signal $A_{31b}$.

After the reset process has been terminated by activation of the switching lines $33_{64}$, $33_{1028}$ etc. to $33_{2048}$ a read process will be carried out again, which is also effected by means of the device $30b$ in FIG. 4. For this purpose the switches 34 are again switched to their first positions, so that the registers (33) are again arranged in series. A pulse then appearing in the signal $A_{31a}$ is then successively shifted through the shift registers 33, the width of the pulse being such that a new row is not activated until the previously activated row has been deactivated.

Both for the device shown in FIG. 2 and that shown in FIG. 4 the width of the pulses of the signals $A_{31}$ and $A_{31b}$ is selected in such a manner that almost all of the charge not supplied to the sensors upon completion of the read process is supplied during the reset process. For this purpose the pulse may be dimensioned, for example, in such a way that the capacitors 2 are recharged to at least 99% of the desired initial voltage equal and opposite to D.C. supply 4. The length of the reset process is then still so small that it does not significantly impair the recording of rapid image sequences.

We claim:

1. An apparatus comprising light-sensitive or X-ray sensitive sensors arranged in a matrix in rows and columns, which sensors produce charge states in dependance upon the amount of incident radiation, each sensor having its own electrical switch, and each row of sensors having an associated switching line of a plurality of switching lines coupled to a control device for selectively activating rows for reading purposes and for selectively activating rows for resetting purposes by controlling the conductive state of said switch of each sensor in an activated row in a manner that for said reading purposes, charge states of the sensors of the activated row are read simultaneously via a plurality of read lines coupled to said switch of the sensors in the activated row, and in the course of reading, these charge states are changed at least partially toward an initial charge state, and for said resetting purposes, the charge states of previously read rows of sensors are changed substantially completely to the initial charge state, and wherein said control device comprises reset means, responsive to successive clock pulses of a reset clock signal, for activating at least one of the previously read rows via said switches of the sensors of the activated previously read row, for, after a first predetermined number of successive clock pulses of the reset clock signal, activating another of the previously read rows, and for deactivating each activated previously read row a second predetermined number of successive clock pulses of the reset clock signal after activating the previously read row.

2. An apparatus as claimed in claim 1, wherein the reset means comprises a shift register device having a clock input for receiving the reset clock signal, an input side for receiving a further pulse signal in the clock rhythm of the reset clock signal, and respective outputs coupled to the respective switching lines, said shift register device comprising means for causing each pulse of the further pulse signal to appear on said respective outputs shifted in time.

3. An apparatus as claimed in claim 1, wherein said read lines are arranged such that the sensors of each column of the matrix have an associated common one of the read lines, and wherein the reset means comprises means for resetting all the sensor rows via said read lines.

4. An apparatus as claimed in claim 1, wherein the reset means comprises means for initially activating one row of sensors and subsequently, after the first predetermined number of clock pulses, activating another of the rows while the initially activated row remains activated.

5. An apparatus as claimed in claim 4, wherein the reset clock signal has a frequency which is higher than a cycling frequency with which the rows are activated successively during the read process.

6. An apparatus as claimed in claim 1, wherein the reset means comprises means for initially activating a third predetermined number, greater than one, of rows of sensors and subsequently, after the first predetermined number of clock pulses, activating said third predetermined number of further rows.

7. An apparatus as claimed in claim 2, wherein the shift-register device comprises a plurality of shift registers associated with respective different groups of the plurality of switch lines, each shift register having a clock input for receiving the reset clock signal, an input side for receiving a further pulse signal in the clock rhythm of the reset clock signal, and respective outputs coupled to respective switching lines of the group associated with the shift register, and means for coupling the input sides of the shift registers to the input side of the shift register, whereby the further pulse signal received at the input side of the shift-register device is applied simultaneously to the input sides of each of the plurality of shift registers, each shift register comprising means for causing each pulse of the further pulse signal to traverse the shift registers in the clock rhythm of the reset clock signal, whereby said further pulse signal appears on the respective outputs of said shift register, successively shifted in time.

8. An apparatus as claimed in claim 1, wherein the reset means also serves for reading the charge states of the sensor during the read process.

9. An apparatus as claimed in claim 8, wherein the frequency of the reset clock signal is equal to a cycling frequency with which the sensor rows are activated successively during the read process.

10. An apparatus as claimed in claim 2, wherein said read lines are arranged such that the sensors of each column of the matrix have an associated common one of the read lines, and wherein the reset means comprises means for resetting all the sensor rows via said read lines.

11. An apparatus as claimed in claim 2, wherein the reset means comprises means for initially activating one row of sensors and subsequently, after the first predetermined number of clock pulses, activating another of the rows while the initially activated row remains activated.

12. An apparatus as claimed in claim 3, wherein the reset means comprises means for initially activating one row of sensors and subsequently, after the first predetermined number of clock pulses, activating another of the rows while the initially activated row remains activated.

13. An apparatus as claimed in claim 11, wherein the reset clock signal has a frequency which is higher than a cycling frequency with which the rows are activated successively during the read process.

14. An apparatus as claimed in claim 12, wherein the reset clock signal has a frequency which is higher than a cycling frequency with which the rows are activated successively during the read process.

15. An apparatus as claimed in claim 2, wherein the reset means comprises means for initially activating a third predetermined number, greater than one, of rows of sensors and subsequently, after the first predetermined number of clock pulses, activating said third predetermined number of further rows.

16. An apparatus as claimed in claim 3, wherein the reset means comprises means for initially activating a third predetermined number, greater than one, of rows of sensors and subsequently, after the first predetermined number of clock pulses, activating said third predetermined number of further rows.

17. An apparatus as claimed in claim 10, wherein the reset means comprises means for initially activating a third predetermined number, greater than one, of rows of sensors and subsequently, after the first predetermined number of clock pulses, activating said third predetermined number of further rows.

18. An apparatus as claimed in claim 16, wherein the shift-register device comprises a plurality of shift registers associated with respective different groups of the plurality of switch lines, each shift register having a clock input for receiving the reset clock signal, an input side for receiving a further pulse signal in the clock rhythm of the reset clock signal, and respective outputs coupled to respective switching lines of the group associated with the shift register, and means for coupling the input sides of the shift registers to the input side of the shift register, whereby the further pulse signal received at the input side of the shift-register device is applied simultaneously to the input sides of each of the plurality of shift registers, each shift register comprising means for causing each pulse of the further pulse signal to traverse the shift registers in the clock rhythm of the reset clock signal, whereby said further pulse signal appears on the respective outputs of said shift register, successively shifted in time.

19. An apparatus as claimed in claim 15, wherein the shift-register device comprises a plurality of shift registers associated with respective different groups of the plurality of switch lines, each shift register having a clock input for receiving the reset clock signal, an input side for receiving a further pulse signal in the clock rhythm of the reset clock signal, and respective outputs coupled to respective switching lines of the group associated with the shift register, and means for coupling the input sides of the shift registers to the input side of the shift register, whereby the further pulse signal received at the input side of the shift-register device is applied simultaneously to the input sides of each of the plurality of shift registers, each shift register comprising means for causing each pulse of the further pulse signal to traverse the shift registers in the clock rhythm of the reset clock signal, whereby said further pulse signal appears on the respective outputs of said shift register, successively shifted in time.

20. An apparatus as claimed in claim 16, wherein the shift-register device comprises a plurality of shift registers associated with respective different groups of the plurality of switch lines, each shift register having a clock input for receiving the reset clock signal, an input side for receiving a further pulse signal in the clock rhythm of the reset clock signal, and respective outputs coupled to respective switching lines of the group associated with the shift register, and means for coupling the input sides of the shift registers to the input side of the shift register, whereby the further pulse signal received at the input side of the shift-register device is applied simultaneously to the input sides of each of the plurality of shift registers, each shift register comprising means for causing each pulse of the further pulse signal to traverse the shift registers in the clock rhythm of the reset clock signal, whereby said further pulse signal appears on the respective outputs of said shift register, successively shifted in time.

\* \* \* \* \*